(12) United States Patent
Spinicchia et al.

(10) Patent No.: US 7,586,070 B2
(45) Date of Patent: Sep. 8, 2009

(54) BOLOMETRIC DEVICE WITH RECEIVING CAVITY FOR MEASURING THE POWER OF A BEAM OF HIGH FREQUENCY MICROWAVES AND PROCESS FOR COATING THE INTERNAL SURFACE OF SAID CAVITY

(75) Inventors: Nicolò Spinicchia, Milan (IT); Alessandro Bruschi, Solaro (IT); Sante Giovanni Cirant, Milan (IT); Valerio Muzzini, Trecate (IT); Antonio Nardone, Gaeta (IT)

(73) Assignee: Consiglio Nazionale Delle Ricerche, Rome (IT)

( * ) Notice: Subject to any disclaimer, the term of this patent is extended or adjusted under 35 U.S.C. 154(b) by 190 days.

(21) Appl. No.: 11/884,871

(22) PCT Filed: Feb. 1, 2006

(86) PCT No.: PCT/EP2006/050605
§ 371 (c)(1), (2), (4) Date: Aug. 22, 2007

(87) PCT Pub. No.: WO2006/089833
PCT Pub. Date: Aug. 31, 2006

(65) Prior Publication Data
US 2008/0164429 A1 Jul. 10, 2008

(30) Foreign Application Priority Data
Feb. 24, 2005 (IT) .......................... MI2005A0290

(51) Int. Cl.
*H05B 6/68* (2006.01)
(52) U.S. Cl. ..................................... 219/759; 219/709

(58) Field of Classification Search .................. 219/759, 219/709, 716, 717, 761
See application file for complete search history.

(56) References Cited

U.S. PATENT DOCUMENTS 4,559,429 A * 12/1985 Holcombe ................... 219/759
5,961,871 A * 10/1999 Bible et al. .................. 219/709

OTHER PUBLICATIONS

XP-002381239, Bruschi et al., Design of a high-power load for millimetre-wave Gaussian beams, Institute of Physics Publishing and International Atomic Energy Agency Nucl. Fusion 43 (2003) 1513-1519.

(Continued)

*Primary Examiner*—Kiet T Nguyen
(74) *Attorney, Agent, or Firm*—Jacobson Holman PLLC

(57) ABSTRACT

The present invention describes a bolometric device with receiving cavity for measuring a beam of high frequency microwaves, comprising a hollow body (1) with receiving cavity (50) having an opening (2) for the entrance of said beam of high frequency microwaves in said receiving cavity (50), a diverging mirror (3) located in the lower part of said cavity (50) for reflecting said beam of microwaves on an absorbent coating material (4) applied on the internal surface (5) of the hollow body (1), a cooling circuit (7) for transferring the thermal energy accumulated on the absorbent coating material (4) and a circuit (6) for measuring the power of the beam of high frequency microwaves entering the hollow body (1). Said absorbent coating material (4) consists of boron carbide. In addition a procedure is described for coating with an absorbent material the internal surface (5) of a hollow body (1) being part of the aforementioned device for measuring a beam of high frequency microwaves (FIG. 1).

7 Claims, 2 Drawing Sheets

OTHER PUBLICATIONS

Greuner et al., Evaluation of vacuum plasma-sprayed boron carbide protection for the stainless steel first wall of Wendelstein 7-X, Journal of Nuclear Materials, 329-333 (2004) 849-854.

Mallener et al., Plasma-Sprayed Coatings for Plasma-Facing Components, Fusion Engineering, 1997, 17$^{TH}$ IEEE/NPSS Symposium.

* cited by examiner

BOLOMETRIC DEVICE WITH RECEIVING CAVITY FOR MEASURING THE POWER OF A BEAM OF HIGH FREQUENCY MICROWAVES AND PROCESS FOR COATING THE INTERNAL SURFACE OF SAID CAVITY

This is a National stage of PCT/EP2006/050605 filed Feb. 1, 2006, and published in English.

The present invention refers to a bolometric device with receiving cavity for measuring the power of a beam of high frequency microwaves and process for coating the internal surface of said cavity.

In the field of thermonuclear fusion research sources of high frequency microwaves (gyrotrons) are used with the purpose of heating the plasma. The measurement of the power of the beam of microwaves is essential because it enables a precise energy balance to be obtained.

The construction of more and more powerful gyrotrons obliges to a continuous technological progress in the construction of systems for measuring the power of the beam of microwaves. Given the high power density, one of the crucial points of the measuring system is the deposit in which the radiation is absorbed.

In the case of ECRH (Electron Cyclotron Resonance Heating) experiments, the frequency used is 140 Ghz.

Bolometric devices, also called "bolometric loads" are known, which consist of a copper sphere with an upper opening to permit the entrance of the radiofrequency within a receiving cavity in whose lower part a diverging mirror is located. The absorption of the radiation comes about by means of a thin layer of ceramic material deposited on the internal surface of the cavity through the air plasma spray (APS) technique.

The diverging mirror has high reflectivity and its object is to distribute the incident radiation over the whole absorbent surface of the sphere. The profile of the mirror has to be specifically calculated so that the radiation reflected on the internal surface is made uniform.

An external cooling circuit removes the thermal energy absorbed. The measurement of the power can be made by detecting simultaneously the difference in temperature between the inlet and the outlet of the fluid, and its flow. A measuring circuit processes said information providing the measurement of the power of the beam of microwaves required.

Currently four bolometric loads of the type described are used in the ENEA Centre of Frascati within the sphere of the ECRH experiment on the FTU tokamak (Frascati Tokamak Upgrade). Each of the gyrotrons used has a pulse length of 0.5 sec. and a power of 0.5 MW.

A first type of thin ceramic layer used on the internal surface of the bolometric power loads is constituted by Alumina-Titania (Al2O3-13TiO2), deposited with the APS (Air Plasma Spray) technique. It presents good absorption characteristics at the frequency of 140 Ghz (average reflectivity 40%); unfortunately above 50 W/cm2 it results inadequate for the purpose.

Instead of the Alumina-Titania (Al2O3-13TiO2) that has already mentioned, Chromia (Cr2O3) can also be used which when submitted to exposures exceeding 50 W/cm2 does not suffer damage. It too however has proven to be inadequate for very high powers.

The ceramic deposit in the portion of bolometric sphere adjacent the mirror in fact tends to get damaged compromising the precision of the measurement.

The causes of such damage have various origins, among the most important are: the density of non-uniform power (interference), the electric arcs and finally the phase transition of the alumina (Al2O3). In fact in the zones in which there is the transition from γ-Al2O3 to α-Al2O3 (Corundum), there is a worsening in the adhesion conditions of the deposit on the substrate of copper and, in certain cases, the detachment of the deposit itself.

Object of the present invention is to produce a bolometric device for measuring a beam of microwaves comprising a hollow body with receiving cavity, to whose internal surface an absorbent coating material is applied having excellent absorption capacities at the normal working frequencies, high fusion temperature and high thermal conductivity so as to overcome the aforementioned problems.

Further object of the present invention is to produce a process for coating with an absorbent material the internal surface of a receiving cavity device for measuring a beam of high frequency microwaves.

In accordance with the invention, this object is achieved with a bolometric device with receiving cavity for measuring a beam of high frequency microwaves, comprising a hollow body with receiving cavity having an opening for the entrance of said beam of high frequency microwaves in said receiving cavity, a diverging mirror located in the lower part of said cavity for reflecting said beam of microwaves on an absorbent coating material applied on the internal surface of the hollow body, a cooling circuit for transferring the thermal energy accumulated on the absorbent coating material and a circuit for measuring the power of the beam of high frequency microwaves entering the hollow body, characterised in that said absorbent coating material consists of boron carbide.

In accordance with the invention, such further object is achieved with a process for coating with an absorbent material the internal surface of a hollow body being part of a device for measuring a beam of high frequency microwaves according to claims 1-4, characterised in that it comprises the phases of:

bringing a mobile means for the production of localised heat at high temperature close to the internal surface of the hollow body, turning on the aforementioned mobile means for the production of localised heat at high temperature, spraying an absorbent coating material by means of a mobile supply device between the mobile means for the production of localised heat at high temperature and the internal surface of the hollow body, said mobile supply device and said mobile means for the production of localised heat at high temperature being in synchronised movement so as to coat the entire internal surface of the hollow body, finishing the coating of said internal surface of the hollow body, turning off and moving away the mobile supply device and the mobile means for the production of localised heat at high temperature.

These and other characteristics of the present invention will be made even clearer by the following detailed description of an embodiment thereof illustrated as non-limiting example in the enclosed drawings, in which.

Figure 1:
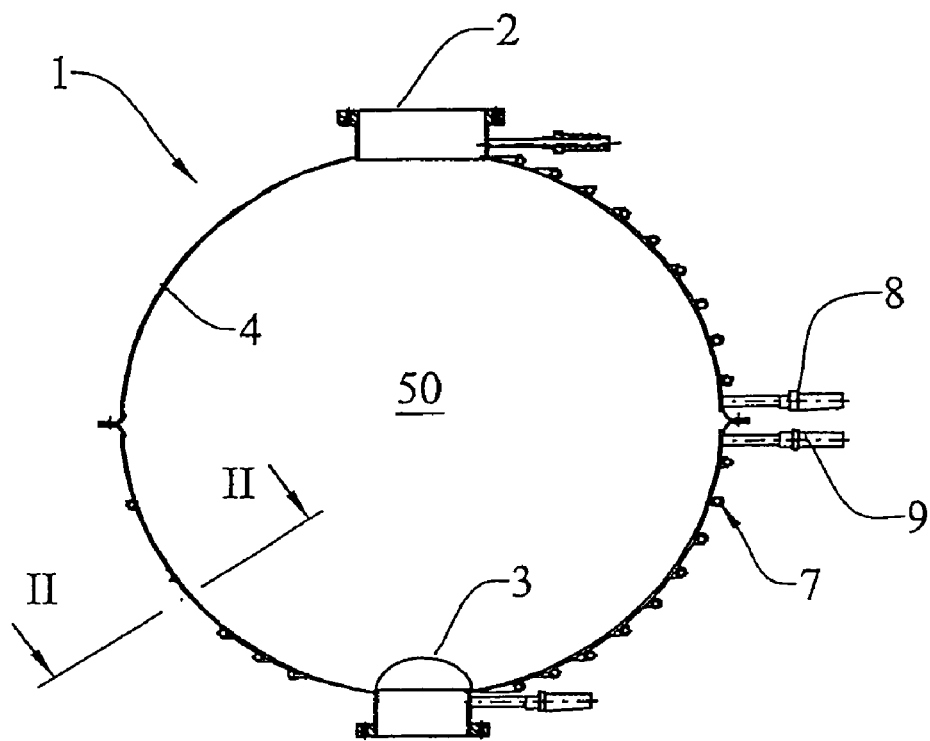
FIG. 1 shows a longitudinal section view of the hollow body.

The device shown in the figures comprises a hollow spherical body 1 (or sphere) fitted with an opening 2 for the entrance of a beam of high frequency microwaves within a receiving cavity 50. In the lower part of the cavity 50 a diverging mirror 3 is located that reflects the beam of microwaves on a coating material 4 (or deposit) applied on the internal surface 5 (FIG. 2) of the hollow body 1, and a measuring circuit 6 of the beam of high frequency microwaves.

Said coating material 4 is the boron carbide (B4C).

An intermediate layer 20 is positioned between the coating material 4 and the internal surface 5 of the sphere 1.

The sphere 1 is wound externally by a cooling circuit 7 that absorbs heat from the sphere 1 and comprises an inlet tube 8 for the flow of cold liquid and an outlet tube 9 for the flow of hot liquid.

Figure 3:
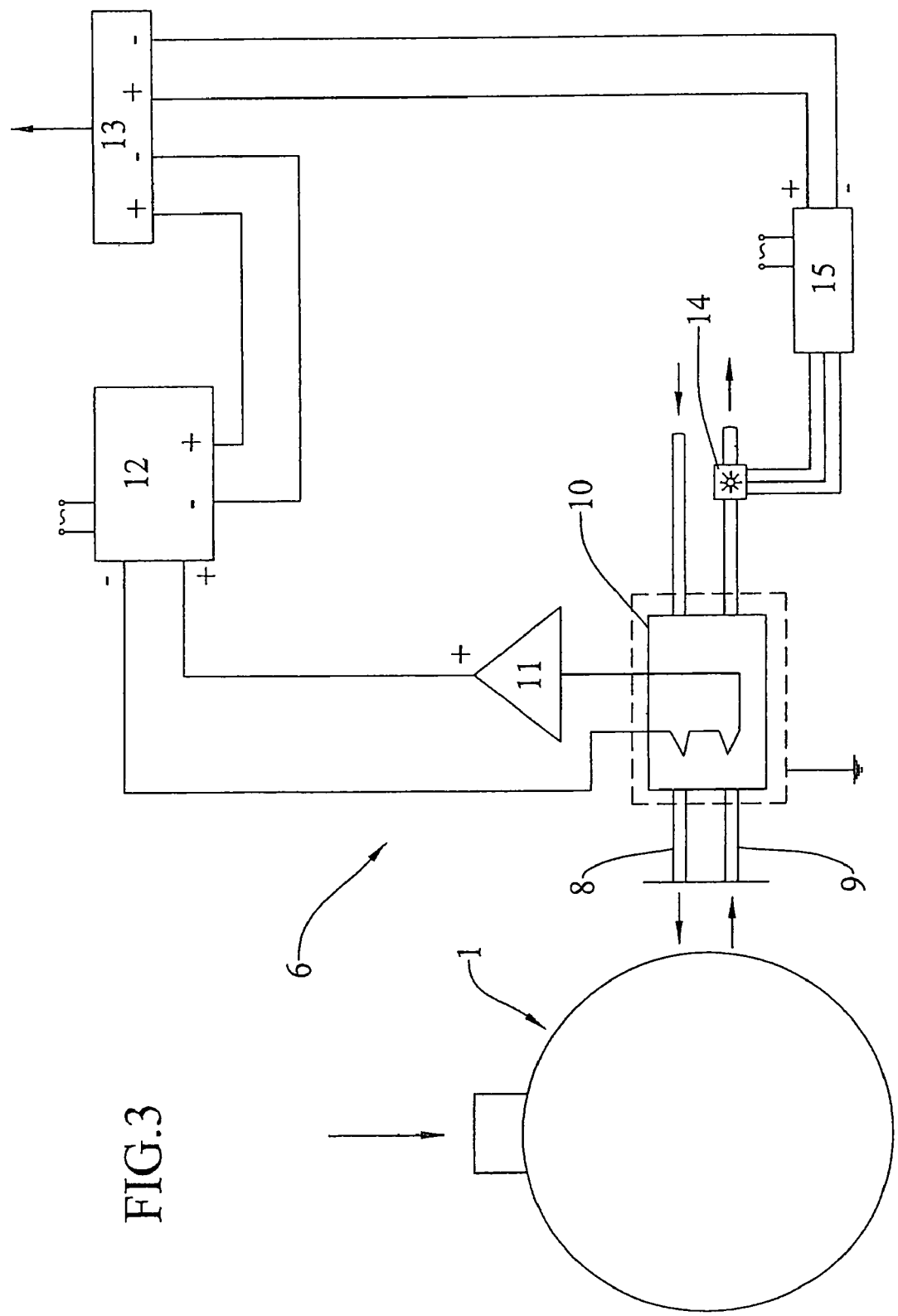
FIG. 3 shows a diagram of the circuit for measuring the power of the beam of high frequency microwaves entering the hollow body.

The measuring circuit 6, shown as example in FIG. 3, comprises a temperature transducer 10 whose voltage signal, amplified by an amplifier 11, reaches a voltage/current converter 12 that sends the current signal to a computer 13 with relative software.

In addition to the temperature transducer 10, said measuring circuit 6 comprises a flow transducer 14 that supplies a voltage signal to a voltage/current converter 15 whose current signal is sent to the aforementioned computer 13.

The hollow body 1 can also not be spherical, for example it can have a cylindrical shape.

The operation of the device shown in the figures is the following.

The beam of microwaves enters the cavity 50 of the sphere 1 through the opening 2 and through the mirror 3 reflects on the boron carbide 4.

The boron carbide (B4C) has excellent stability at high thermal flows (300 W/cm2) and excellent absorption at the frequency of 140 Ghz.

It thus results particularly suitable for this type of application.

The heat absorbed by the boron carbide 4 is transferred to the liquid that flows in the cooling circuit 7 that surrounds the sphere 1, thus enabling the heat absorbed by the sphere 1 to be transferred to the measuring circuit 6.

The difference in temperature between the entering cold liquid in input and hot liquid going out gives origin to a voltage signal by means of the temperature transducer 10.

The amplifier 11 amplifies the aforementioned voltage signal that is converted in current by the converter 12 to then reach the computer 13.

The flow or rate of the hot liquid going out of the sphere 1 gives origin, by means of the flow transducer 14, to a voltage signal that is converted into a current signal by the converter 15. Said current signal finally reaches the computer 13.

The values of the current signals coming from the converters 12 and 15 enable the value of energy or power measured to be obtained in output from the computer 13.

The known coating materials did not enable such absorption that would permit efficient measurement of the power or energy of the beam, as instead is permitted, according to the invention, by the boron carbide.

The boron carbide 4 is deposited on the intermediate layer 20 (or also directly on the internal surface 5 of the sphere 1), for example by means of a deposit technique called VPS (Vacuum Plasma Spray) similar to the APS technique previously mentioned.

The process for depositing the boron carbide 4 on the intermediate layer 20 foresees the following phases:

bringing a mobile means for the production of localised heat at high temperature close to the intermediate layer 20;

turning on the aforementioned mobile means for the production of localised heat at high temperature;

spraying particles of boron carbide 4 by means of a mobile supply device between the mobile means for the production of localised heat at high temperature and the intermediate layer 20, said mobile supply device and said mobile means for the production of localised heat at high temperature being in synchronised movement so as to coat the entire intermediate layer 20 that coats the internal surface 5 of the hollow body 1;

finishing the coating of the intermediate layer 20, turning off and moving away the mobile supply device and the mobile means for the production of localised heat at high temperature.

Figure 2:
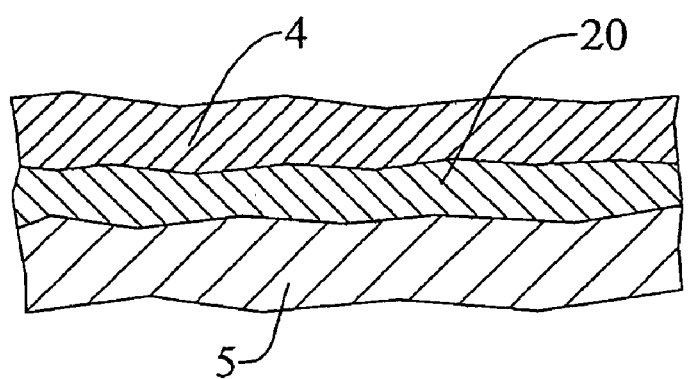
FIG. 2 shows an enlarged section view according to the line II-II of FIG. 1.

The boron carbide 4 can be applied directly on the internal surface 5 of the sphere 1 without interposing an intermediate layer 20 whose presence is however important as it prevents possible detachment caused by the different temperatures (because of the different coefficients of thermal expansion) between the different materials in contact. In the normal conditions of radiation with gyrotrons of 1 MW (or 2 MW) the copper (that is the material of the sphere 1) results to be at the temperature of approximately 100° C. while, in some zones, the absorbent deposit could exceed 900° C. FIG. 2 represents the section of a sample of copper 5 covered by the absorbent deposit 4. Between the two, the intermediate layer 20 can be clearly seen. So that the heating does not produce detachment, the thermal expansion coefficient of the intermediate layer 20 must be intermediate between that of the copper and that of the absorbent deposit 4.

The mobile means for the production of localised heat can consist of an electrode torch. Gas is injected between opposing anode and cathode, at the ends of which an electric arc is struck that triggers a flame at extremely high temperature (7000-8000° C.) which is "shot" in the vicinity of the intermediate layer 20.

By supplying particles of boron carbide 4 between the torch and the intermediate layer 20 a compact fine coating can be created.

In fact the deposit 4 originates from the single particles of boron carbide which, melted or partially melted, impact on the intermediate layer 20 (or directly on the internal surface 5). The phenomena that come about during this phase determine the adhesion of the deposit 4 on the intermediate layer 20. The melted particles deform and take on a laminar shape and solidifying form a column or fine grain crystal. The torch moves over the intermediate layer 20 and the layer deposited results composed of a variable number of laminas in function of the parameters selected. The phenomena that come about inside the layers determine the crystalline structure, the porosity and the presence of micro cracks. The torch passes several times on the same position according to how the sphere has to be coated.

The layers of the surface of boron carbide 4 are also submitted to the action of the environment, oxidation and cooling, this latter brings about tension stress that can lead to breaking or to the detachment of the deposit 4. Usually the final thickness of the deposit 4 is reached after being passed over with the torch on the same point a number of times greater than or equal to ten.

To cover the entire intermediate layer 20 of the sphere 1 the torch and the boron carbide supply device must be mobile in space.

The intermediate layer 20 is applied on the internal surface 5 before the boron carbide 4 and with the same technique.

The VPS technique produces deposits with much lower porosity, compared to the APS (Air Plasma Spray), consequently making the thermal conductivity increase.

The invention claimed is:

1. The bolometric device with receiving cavity for measuring a beam of high frequency microwaves, comprising a hollow body with receiving cavity having an opening for the entrance of said beam of high frequency microwaves in said receiving cavity, a diverging mirror located in the lower part of said cavity for reflecting said beam of microwaves on an absorbent coating material applied on the internal surface of the hollow body, a cooling circuit for transferring the thermal energy accumulated on the absorbent coating material and a circuit for measuring the power of the beam of high frequency microwaves entering the hollow body, characterised in that said absorbent coating material consists of boron carbide.

2. The device according to claim 1, characterised in that said hollow body has a spherical shape.

3. The device according to claim 1, characterised in that said power measuring circuit comprises temperature and flow transducers generating voltage signals that can be converted into current signals by voltage/current converters for sending to a computer with relative software.

4. The device according to claim 1, characterised in that said cooling circuit winds the hollow body and comprises an inlet tube with cold liquid and an outlet tube with hot liquid.

5. The process for coating with an absorbent material the internal surface of a hollow body being part of a device for measuring a beam of high frequency microwaves according to claim 1, characterised in that it comprises the phases of:

bringing a mobile means for the production of localised heat at high temperature close to the internal surface of the hollow body, turning on the aforementioned mobile means for the production of localised heat at high temperature, spraying an absorbent boron carbide coating material by means of a mobile supply device between the mobile means for the production of localised heat at high temperature and the internal surface of the hollow body, said mobile supply device and said mobile means for the production of localised heat at high temperature being in synchronised movement so as to coat the entire internal surface of the hollow body, finishing the coating of said internal surface of the hollow body, turning off and moving away the mobile supply device and the mobile means for the production of localised heat at high temperature.

6. The process according to claim 5, characterised in that it provides for the application of an intermediate layer on the internal surface, the coating material being applicable on said intermediate layer.

7. The process according to claim 5, characterised in that said mobile means for the production of localised heat at high temperature consists in an electrode torch.

* * * * *